US012499762B2

(12) United States Patent
Sugaya

(10) Patent No.: US 12,499,762 B2
(45) Date of Patent: Dec. 16, 2025

(54) SUPPORT TARGET INTERSECTION EXTRACTION SYSTEM AND VEHICLE SUPPORT DEVICE

(71) Applicant: TOYOTA JIDOSHA KABUSHIKI KAISHA, Toyota (JP)

(72) Inventor: Fumio Sugaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/212,737

(22) Filed: Jun. 22, 2023

(65) Prior Publication Data
US 2024/0078904 A1 Mar. 7, 2024

(30) Foreign Application Priority Data
Sep. 2, 2022 (JP) .................................. 2022-139951

(51) Int. Cl.
*G08G 1/0967* (2006.01)
*B60T 7/12* (2006.01)
(52) U.S. Cl.
CPC .......... *G08G 1/096791* (2013.01); *B60T 7/12* (2013.01)
(58) Field of Classification Search
CPC .................. G08G 1/096791; B60T 7/12
See application file for complete search history.

(56) References Cited

U.S. PATENT DOCUMENTS

| | | | |
|---|---|---|---|
| 9,008,890 B1* | 4/2015 | Herbach | G05D 1/0297 340/436 |
| 9,947,052 B1* | 4/2018 | Slusar | G08G 1/096716 |
| 11,610,479 B1* | 3/2023 | Hansen | G08G 1/08 |
| 2008/0147319 A1* | 6/2008 | Cubillo | G01C 21/3874 701/431 |
| 2010/0110105 A1* | 5/2010 | Kinnunen | G06F 3/0485 345/629 |
| 2012/0166076 A1* | 6/2012 | Hardy | G01C 21/3415 701/414 |
| 2014/0277888 A1* | 9/2014 | Dastoor | B60L 58/22 701/22 |

(Continued)

FOREIGN PATENT DOCUMENTS

JP 2017-206117 A 11/2017
JP 2020-140310 A 9/2020

*Primary Examiner* — Hussein Elchanti
(74) *Attorney, Agent, or Firm* — Dinsmore & Shohl LLP

(57) ABSTRACT

A support target intersection extraction system that extracts a support target intersection that is a target of vehicle support in a support target vehicle among intersections included in map information includes: a priority road extraction unit that extracts a priority road among roads connected to the intersection, based on position information, travel information, and the map information acquired from a plurality of probe vehicles; a risk reduction amount calculation unit that calculates a risk reduction amount on the priority road side at the intersection where the priority road is extracted, based on the position information and the travel information acquired from the probe vehicles; and a support target intersection extraction unit that extracts the support target intersection from the intersections where a travel road of the support target vehicle is the priority road and the risk reduction amount is less than a risk reduction amount threshold.

5 Claims, 6 Drawing Sheets

(56) References Cited

U.S. PATENT DOCUMENTS

| | | | |
|---|---|---|---|
| 2016/0019434 A1* | 1/2016 | Caldwell | G06V 10/462 |
| | | | 345/474 |
| 2016/0154538 A1* | 6/2016 | Wang | G01C 21/3664 |
| | | | 715/771 |
| 2018/0299284 A1* | 10/2018 | Wang | G08G 1/0112 |
| 2019/0092389 A1* | 3/2019 | McGill | B62D 1/22 |
| 2019/0170527 A1* | 6/2019 | Inoue | G08G 1/00 |
| 2019/0206254 A1* | 7/2019 | Tao | B60W 30/0956 |
| 2019/0212744 A1* | 7/2019 | Milstein | G05D 1/0217 |
| 2020/0020227 A1* | 1/2020 | Ran | G08G 1/075 |
| 2020/0020234 A1* | 1/2020 | Cheng | G08G 1/0112 |
| 2020/0207343 A1* | 7/2020 | Vassilovski | G08G 1/167 |
| 2020/0239031 A1* | 7/2020 | Ran | G08G 1/0125 |
| 2020/0242922 A1* | 7/2020 | Dulberg | G08G 1/166 |
| 2020/0269850 A1 | 8/2020 | Tohriyama et al. | |
| 2020/0388161 A1* | 12/2020 | Kim | H04W 4/40 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |

* cited by examiner

SUPPORT TARGET INTERSECTION EXTRACTION SYSTEM AND VEHICLE SUPPORT DEVICE

CROSS-REFERENCE TO RELATED APPLICATION

This application claims priority to Japanese Patent Application No. 2022-139951 filed on Sep. 2, 2022, incorporated herein by reference in its entirety.

BACKGROUND

1. Technical Field

The present disclosure relates to a support target intersection extraction system and a vehicle support device.

2. Description of Related Art

Conventionally, Japanese Unexamined Patent Application Publication No. 2020-140310 (JP 2020-140310 A) is known as a technical document related to a support target intersection extraction system. In this publication, it is shown that a risk of a curve or an intersection is determined based on a driving behavior of a driver of a vehicle in an evaluation device for evaluating a risk existing around a road on which the vehicle travels.

SUMMARY

The risk occurrence factor is different depending on the environment around the intersection, and there has been an issue that the risk occurrence factor cannot be specified in the related art. In the related art, when it is desired to extract only a scene in which a driver predicts a risk of a pedestrian or the like running out in front of the driver's vehicle and performs deceleration or steering in advance to reduce a collision risk, and to support it, the related art cannot be used for the realization.

An aspect of the present disclosure is a support target intersection extraction system that extracts a support target intersection that is a target of vehicle support in a support target vehicle among intersections included in map information. The support target intersection extraction system includes: a priority road extraction unit that extracts a priority road among roads connected to the intersection, based on position information, travel information, and the map information acquired from a plurality of probe vehicles; a risk reduction amount calculation unit that calculates a risk reduction amount on the priority road side at the intersection where the priority road is extracted, based on the position information and the travel information acquired from the probe vehicles; and a support target intersection extraction unit that extracts the support target intersection from the intersections where a travel road of the support target vehicle is the priority road and the risk reduction amount is less than a risk reduction amount threshold.

In the support target intersection extraction system according to the aspect of the present disclosure, the support target intersection extraction system may further include a shielding determination unit that determines whether an intersecting road intersecting the travel road at the intersection is shielded when viewed from the travel road, based on a detection result of an external sensor of the support target vehicle. The support target intersection extraction unit may extract the support target intersection from among the intersections where a determination is made that the intersecting road is shielded when viewed from the travel road, among the intersections where the travel road of the support target vehicle is the priority road and the risk reduction amount is less than the risk reduction amount threshold.

Another aspect of the present disclosure is a vehicle support device that executes vehicle support of the support target vehicle at the support target intersection extracted by the support target intersection extraction system described above. The vehicle support device includes a vehicle control unit that executes a collision damage reduction brake as the vehicle support based on a detection result of an external sensor of the support target vehicle. The vehicle control unit loosens an operating condition of the collision damage reduction brake at the support target intersection compared to an operating condition at another intersection.

According to the aspect of the present disclosure, it is possible to appropriately extract a support target intersection that is a target of vehicle support of a support target vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
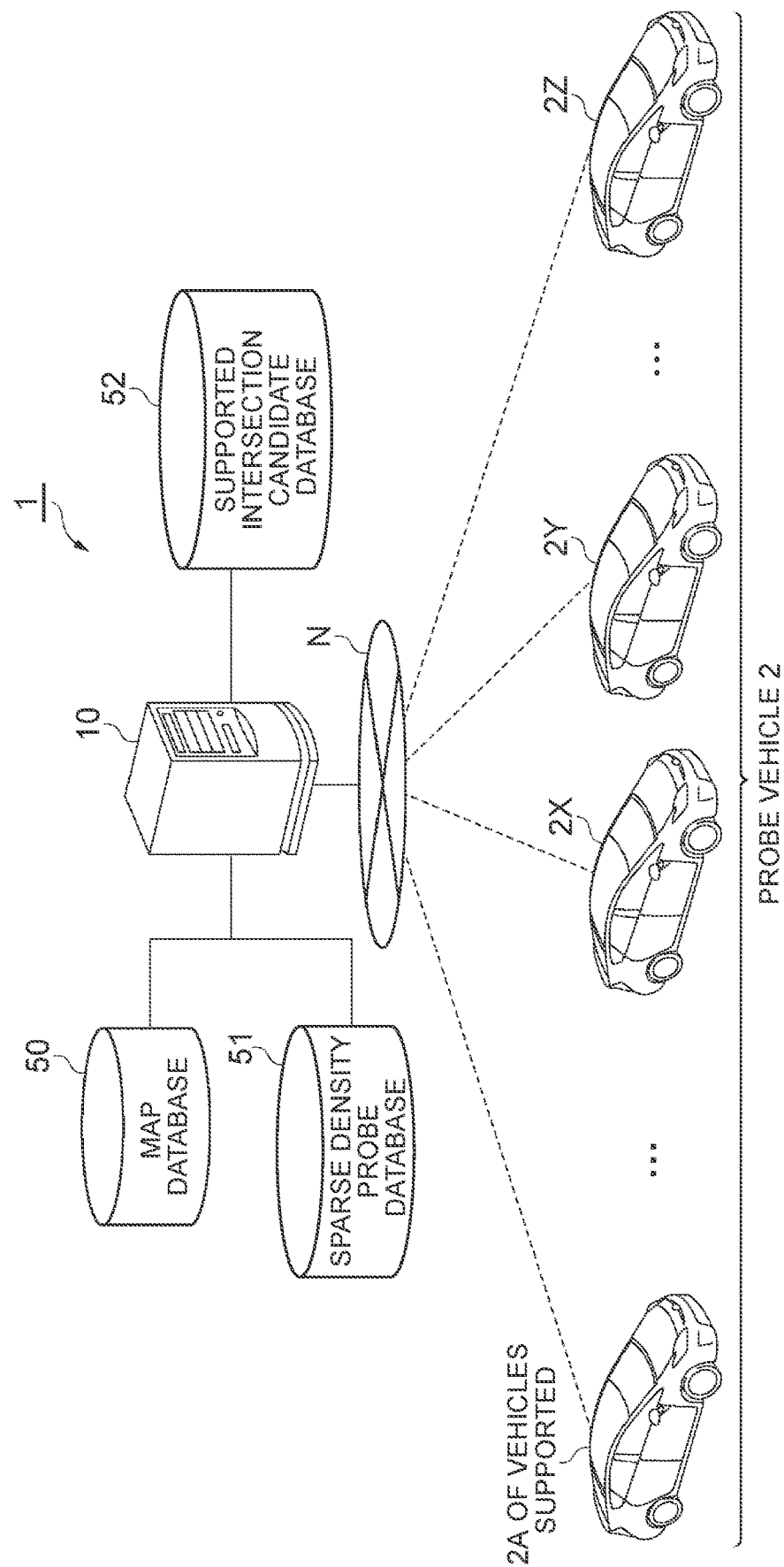
FIG. 1 is a diagram for describing a support target intersection extraction system.

FIG. 1 is a diagram illustrating a support target intersection extraction system according to the present embodiment. The support target intersection extraction system 1 illustrated in FIG. 1 includes an electronic control unit (ECU) of a server 10 and a support target vehicle 2A. The support target intersection extraction system 1 is a system that extracts a support target intersection that is an intersection that is a target of vehicle support of the support target vehicle 2A from among the intersections on the map. The support target vehicle 2A is a vehicle that executes vehicle support. The vehicle assistance is, for example, Autonomous Emergency Braking System (AEBS), deceleration assistance, and avoidance assistance. The content of the vehicle support is not particularly limited.

The servers 10 are communicably connected to a probe vehicle 2 (probe vehicle 2A to 2Z) via a network N. The network N is a wireless communication network. The network N may be a communication network for a mobile phone or the Internet. The network N is not particularly limited, and a well-known technique can be adopted.

The probe vehicle 2 is a vehicle that provides position information and travel information to the server 10 as probe data. The position information and the travel information may be associated with time. The probe vehicle 2 includes, for example, a probe vehicle 2A to 2Z. The probe vehicle 2 may be composed of two or more vehicles. In the present embodiment, the support target vehicle 2A is also provided to the servers 10 as the probe vehicle 2. The support target vehicle 2A may be a vehicle that only acquires information used for vehicle support from the server 10 without providing information to the server 10. The probe vehicle 2 and/or the assisted vehicle 2A may be an autonomous vehicle.

The map database 50 is a database that stores map information. The map information includes location information of a road, information of a road shape, location information of an intersection, and the like. The map information may be stored in the form of road links and intersection nodes. In addition, the map information may include information on the presence or absence of a traffic light at the intersection.

The sparse density probe database 51 is a database that stores positional information and traveling information of each probe vehicle 2 collected from the traveling probe vehicle 2. The travel information includes vehicle speed information. The travel information may include longitudinal acceleration information and lateral acceleration information. The sparse-density probe data is easier to collect by communication than the high-density probe data, and can constantly collect various data from a large number of probe vehicles 2.

The support target intersection candidate database 52 is a database that stores support target intersection candidates. The support target intersection candidate is an intersection which is a candidate of the support target intersection.

Figure 2:
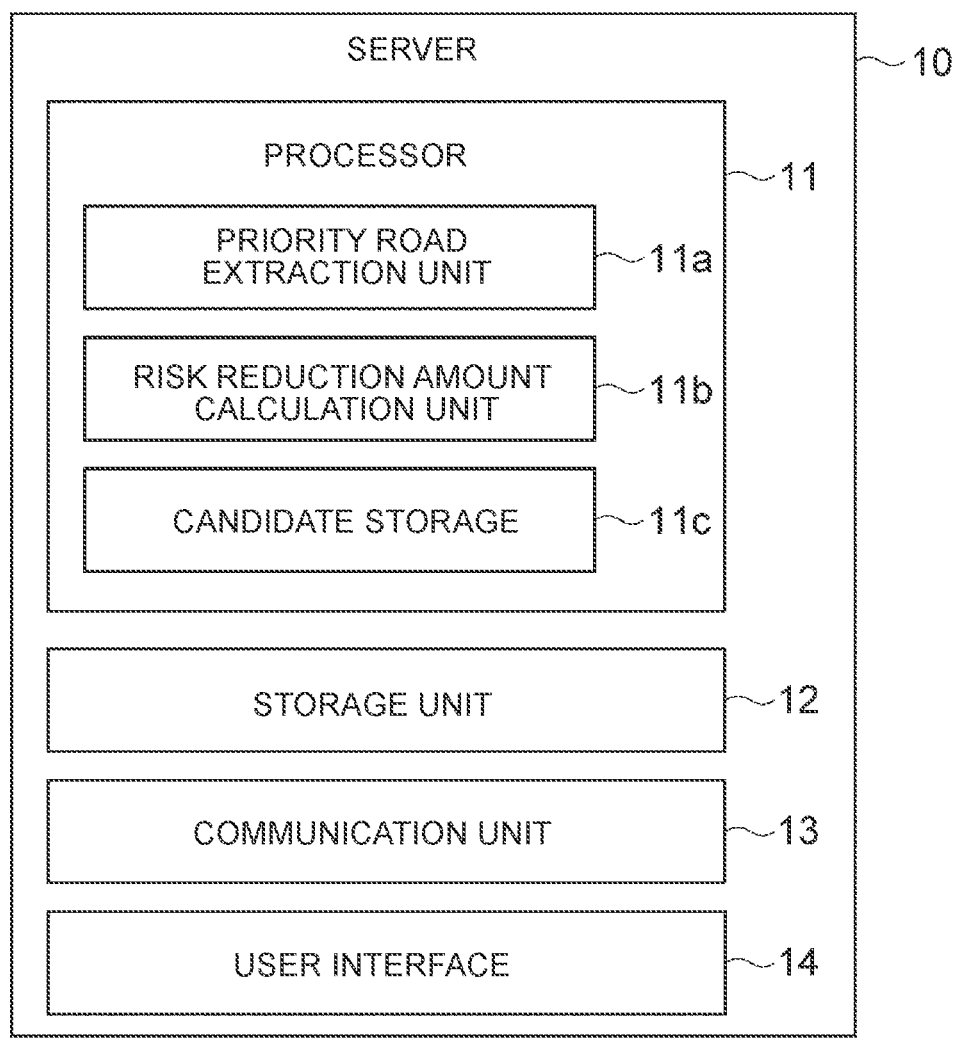
FIG. 2 is a diagram illustrating a configuration of a server.

FIG. 2 is a diagram illustrating a configuration of a server; As illustrated in FIG. 2, the server 10 includes a processor 11, a storage unit 12, a communication unit 13, and a user interface 14. The server 10 may include a storage unit in addition to various databases.

The processor 11 operates, for example, an operating system to control the server 10. The processor 11 is an arithmetic unit such as a Central Processing Unit (CPU including a control device, an arithmetic device, a register, and the like. The processor 11 controls the communication unit 13 and the user interface 14. The processor 11 controls data transmission and reception to and from the map database 50, the sparse density probe database 51, and the support target intersection candidate database 52.

The storage unit 12 may be a ROM and/or a RAM, or may be a storage medium such as a Hard Disk Drive (HDD) configured as a Redundant Arrays of Inexpensive Disks (RAID). The communication unit 13 is a communication device for performing communication via the network N. Network devices, network controllers, network cards, etc. can be used for communication part 13. The user interface 14 is a device including a display, an output device such as a speaker, and an input device such as a touch panel.

Next, a functional configuration of the server 10 will be described. As illustrated in FIG. 2, the processor 11 of the server 10 includes a priority road extraction unit 11a, a risk reduction amount calculation unit 11b, and a candidate-storage unit 11c.

The priority road extraction unit 11a extracts the priority roads from the roads connected to the intersections on the basis of the map information stored in the map database 50 and the position information and the travel information of the respective probe vehicles 2 stored in the sparse density probe database 51. The priority road is a road having a high traveling priority at an intersection where no signal is provided.

Based on the locus of each probe vehicle 2 entering the intersection and the mapping result of the vehicle speed change, the priority road extraction unit 11a extracts the priority road from the road connected to the intersection by using the feature that the vehicle traveling on the priority road has a small reduction in the vehicle speed and the vehicle traveling on the non-priority road (the road that is not the priority road at the intersection) has the vehicle speed averaging approaching zero because the vehicle travels on the non-priority road is temporarily stopped.

The priority road extraction unit 11a determines, for example, a road where the average value of the vehicle speeds of the probe vehicles 2 in front of the intersection is near zero (for example, less than 5 km/h) as a non-priority road from the vehicle speed change corresponding to the position of the plurality of probe vehicles 2 that travel on the roads intersecting each other at the intersection and approach the intersection, and extracts, as the priority road, a road where the average value of the vehicle speed reduction amounts of the probe vehicles 2 in front of the intersection is less than a certain threshold among the roads intersecting the non-priority road. The value of the determination threshold near zero and the value of the constant threshold are not particularly limited.

The priority road extraction unit 11a may determine the presence or absence of a traffic light at the intersection. When the map information includes information on the presence or absence of a traffic light at the intersection, the priority road extraction unit 11a determines the presence or absence of a traffic light at the intersection based on the map information. The priority road extraction unit 11a may determine the presence or absence of a traffic light at the intersection based on the vehicle speed data of the probe vehicle 2, since the vehicle stopped by the red signal and the vehicle passing by the blue signal coexist at the intersection with the traffic light.

The risk reduction amount calculation unit 11b calculates a risk reduction amount at an intersection on the priority road side at the intersection where the priority road is extracted, based on the position information and the travel information acquired from the plurality of probe vehicles.

The risk reduction amount may be obtained, for example, as a value obtained by calculating a difference in the value of the risk with respect to a case where the change in the vehicle speed and the steering of the probe vehicle 2 from a predetermined distance (for example, 20 m) to 0 m of the intersection is not changed by a predetermined number at the same intersection and averaging the difference. The predetermined number may be 10 or more, may be 50 or may be 80. In other words, the risk reduction amount can be obtained as a difference between the values of the risk calculated from the behavior actually taken by the probe vehicle 2 (the trajectory and the vehicle speed change) and the behavior in the case where it is assumed that the probe vehicle 2 does not take the risk avoidance in consideration of the risk avoidance at the intersection (for example, the pedestrian jumping out).

As a method of determining the risk (quantification method), a method using the risk field described in Japanese Unexamined Patent Application Publication No. 2017-206117 (JP 2017-206117 A) can be adopted. Note that, since this method is used for comparison between intersections, there is no particular limitation on an assumed value of a jump-out speed of a traffic participant (such as a pedestrian or another vehicle) in the risk field and a deceleration of the own vehicle. For example, by calculating the risk field values for the case where the traffic participants are not avoided at the intersection every 100 m seconds and the case where the actual driving of the probe vehicle 2 is performed, and accumulating the difference to the intersection, it is possible to quantitatively calculate the degree of the risk avoidance action taken by the driver of the probe vehicle 2.

Figure 3:
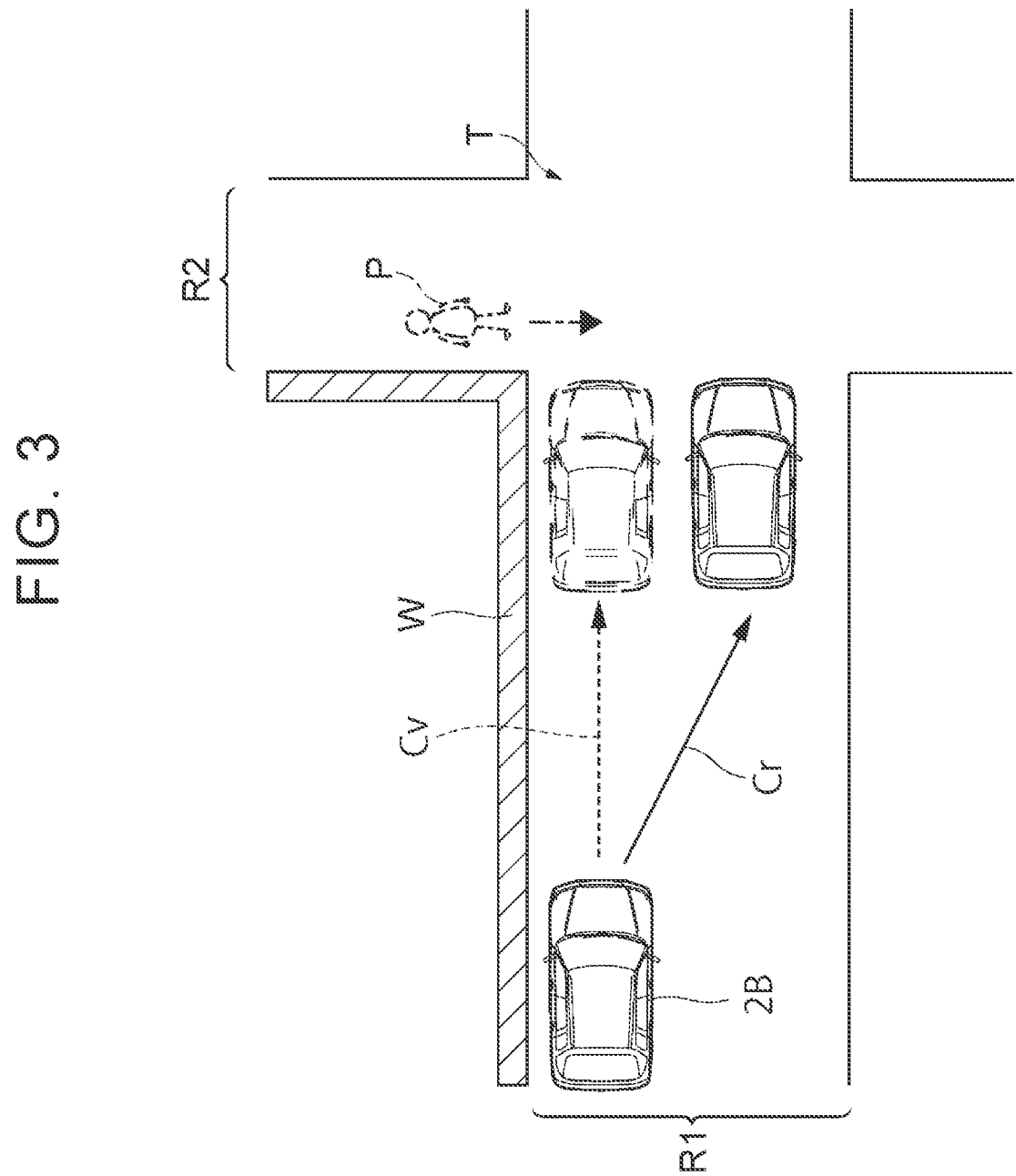
FIG. 3 is a diagram for explaining an example of calculation of a risk reduction amount.

FIG. 3 is a diagram for explaining an example of calculation of the risk reduction amount. FIG. 3 shows a crossroad intersection T, a priority road R1, a non-prioritized road R2, a probe vehicle 2B, and a wall W. The priority road R1 is a traveling road on which the probe-vehicle 2B travels. The non-priority road R2 is an intersecting road that intersects the priority road R1 at the intersection T. The vehicle speed of the probe vehicle 2B is 40 km/h. The wall W is formed so as to shield the non-priority road R2 (crossing road) when viewed from the priority road R1 (traveling road) on which the probe-vehicle 2B travels. That is, the drivers of the probe vehicle 2B cannot visually recognize the traffic participants (e.g., pedestrians P) that jump out of the non-priority road R2. The intersection T is an intersection with poor visibility.

In addition, FIG. 3 shows the actual travel locus Cr and the temporary travel locus Cv of the probe-vehicle 2B. In the actual travel locus Cr, the probe vehicle 2B is traveling so as to take a distance from the intersection T entrance of the non-priority road R2 while decelerating to 30 km/h, considering the possibility that a traffic participant such as the pedestrian P jumps out of the non-priority road R2 of the left hand. On the other hand, in the temporary travel locus Cv, the probe-vehicle 2B travels straight without decelerating.

The risk reduction amount calculation unit 11b calculates, as the risk reduction amount, a difference between the risk field values of the case of the temporary travel locus Cv and the case of the actual travel locus Cr in the section from the probe-vehicle 2B to the entrance of the intersection T shown in FIG. 3. In the risk field, when the speed of the pedestrian P is taken as a 2 m/s, it is assumed that 0.5 s period was 1 m increased by a distance from the non-priority road R2 in the actual travel locus Cr, and consequently the impact speed of 17 km/h could be reduced.

The candidate storage unit 11c extracts support target intersection candidates and stores them in the support target intersection candidate database 52. The candidate storage unit 11c extracts, as the support target intersection candidate, an intersection in which the risk reduction amount is less than the risk reduction amount threshold among the intersections included in the map information. The risk reduction amount threshold value is a threshold value of a preset value. An arbitrary value of the risk reduction amount threshold value may be set by the system administrator. The candidate storage unit 11c may extract, as the support target intersection candidate, an intersection where there is no traffic light among the intersections where the risk reduction amount is less than the risk reduction amount threshold.

The candidate storage unit 11c stores the support target intersection candidate in the support target intersection candidate database 52. The candidate storage unit 11c may store the support target intersection candidate as the latitude and longitude information, or may store the support target intersection candidate in association with the intersection node of the map information. The candidate storage unit 11c stores support target intersection candidates in association with the prioritized road (or intersection approach direction). The candidate storage unit 11c may set a risk-level for each support-target intersection candidate. The degree of risk is the degree of risk corresponding to the environment of the intersection.

The candidate storage unit 11c may store the risk-taking amount data in the support-target intersection candidate database 52 in addition to the position information of the support-target intersection candidate. The risk take amount data is obtained by calculating the degree of risk taken by the driver of the probe vehicle 2 in the support target intersection candidate according to the concept of the risk field described above. The risk take amount data is obtained from the average of the driving data of the plurality of probe vehicles 2, and is different from the risk level.

The candidate storage unit 11c may store, in the support target intersection candidate database 52, sudden deceleration occurrence information (near miss information) in addition to the position information of the support target intersection candidate. The sudden deceleration occurrence information indicates that the sudden deceleration is required due to the jumping of the traffic participant or the like in the support target intersection candidate. The candidate storage unit 11c may set the degree of risk of the support target intersection candidate in which the sudden deceleration has occurred to be higher than in the case in which the sudden deceleration has not occurred.

When the data transmitted from the probe vehicle 2 includes an image captured by the front camera of the probe vehicle 2, the candidate storage unit 11c may determine whether the support target intersection candidate is an intersection with poor visibility by a well-known image recognition process. The candidate storage unit 11c may store, in the support target intersection candidate database 52, a determination result of whether or not the intersection is a poorly prospective intersection in association with the support target intersection candidate. The candidate storage unit 11c may set the risk level of the support target intersection candidate determined to be an intersection with poor visibility as a higher value than when the support target intersection candidate is not determined to be an intersection with poor visibility.

When the map information of the map database 50 includes information of the road width, the candidate storage unit 11c may determine whether the road width is a narrow road having a constant value or less. The candidate storage unit 11c may store the determination result of whether or not the road is a narrow road in the support target intersection candidate database 52 in association with the support target intersection candidate. The candidate storage unit 11c may set the risk-level of the support-target intersection candidate determined to be a narrow road higher than the risk-level of the support-target intersection candidate determined not to be a narrow road.

When the map information of the map database 50 includes information on the intersection environment such as information on the presence or absence of the crosswalk, the candidate storage unit 11c may associate the support target intersection candidate and the information on the intersection environment and store the information on the support target intersection candidate in the support target intersection candidate database 52. It is possible to devise to use these pieces of information for extracting the support target intersection.

Figure 4:
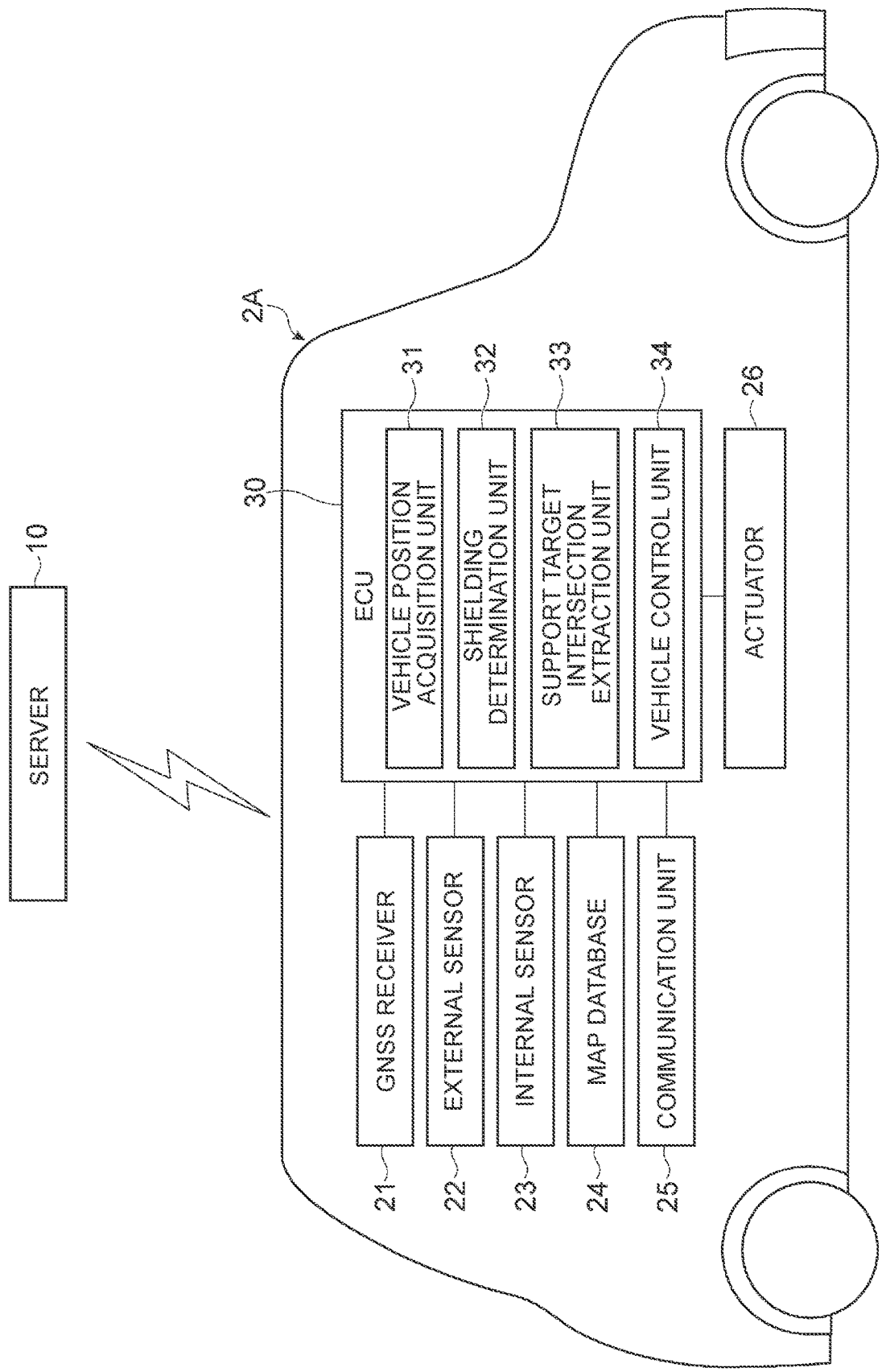
FIG. 4 is a diagram illustrating a functional configuration of a support target vehicle.

Next, a functional configuration of the support target vehicle 2A will be described. FIG. 4 is a diagram illustrating a functional configuration of a support target vehicle 2A. As illustrated in FIG. 4, the support target vehicle 2A has an ECU 30. ECU 30 is an electronic control unit having a CPU, ROM, RAM or the like. ECU 30 functions as a vehicle support device.

ECU 30 is connected to a Global Navigation Satellite System (GNSS) reception unit 21, an external sensor 22, an internal sensor 23, a map database 24, a communication unit 25, and an actuator 26.

GNSS reception unit 21 measures the position (for example, latitude and longitude) of the support target vehicle 2A by receiving signals from a plurality of GNSS satellites. GNSS reception unit 21 transmits the measured position data of the support target vehicle 2A to ECU 30.

The external sensor 22 is an in-vehicle sensor that detects an external environment of the support target vehicle 2A. The external sensor 22 includes at least a camera. The camera is an imaging device that captures an image of the external environment of the support target vehicle 2A. For example, the camera is provided on the rear side of the windshield of the support target vehicle 2A, and captures an image of the front side of the vehicle. The cameras transmit imaging data about the external environment of 2A of the assisted vehicles to ECU 30. The camera may be a monocular camera or a stereo camera. A plurality of cameras may be provided, and in addition to the front of the support target vehicle 2A, the left and right sides and the rear may be imaged.

The external sensor 22 may include a radar sensor. The radar sensor is a detecting device that detects an object in the vicinity of 2A of the support target by using radio waves (for example, millimeter waves) or light. The radar sensor includes, for example, a millimeter-wave radar or a Light Detection and Ranging (LIDAR). The radar sensor transmits radio waves or light to the surroundings of the support target vehicle 2A, and detects the object by receiving the radio waves or light reflected by the object. The radar sensor transmits the detected object data to ECU 30.

The internal sensor 23 is an in-vehicle sensor that detects a traveling condition of the support target vehicle 2A. The internal sensor 23 includes a vehicle speed sensor, an acceleration sensor, and a yaw rate sensor. The vehicle speed sensor is a detector that detects the speed of the support target vehicle 2A. As the vehicle speed sensor, a wheel speed sensor that is provided for a wheel of the support target vehicle 2A or a drive shaft that rotates integrally with the wheel and detects the rotational speed of the respective wheels can be used. The vehicle speed sensor transmits the detected vehicle speed information (wheel speed information) to ECU 30.

The acceleration sensor is a detector that detects an acceleration of the support target vehicle 2A. The acceleration sensor includes, for example, a longitudinal acceleration sensor that detects a longitudinal acceleration of the support target vehicle 2A. The acceleration sensor may include a lateral acceleration sensor that detects a lateral acceleration of the support target vehicle 2A. The acceleration sensor transmits, for example, acceleration data of the support target vehicle 2A to ECU 30. The yaw rate sensor is a detector that detects a yaw rate (rotational angular velocity) around the vertical axis of the center of gravity of the support target vehicle 2A. As the yaw rate sensor, for example, a gyro sensor can be used. The yaw rate sensor transmits the detected yaw rate data of the support target vehicle 2A to ECU 30.

The map database 24 is a database that stores map information. The map database 24 is formed in a storage device such as a Hard Disk Drive (HDD mounted on the host vehicle, for example. The map information includes, for example, location information of a road, information of a road shape, location information of an intersection, and the like.

The communication unit 25 is a communication device that controls radio communication with the outside of the support target vehicle 2A. The communication unit performs transmission and reception of various kinds of information by communication with the server 10. When the support target vehicle 2A functions as the probe vehicle, the communication unit 25 transmits the position information and the travel information of the support target vehicle 2A to the servers 10.

In addition, the communication unit 25 acquires, from the servers 10, information of support target intersection candidates for use in vehicle support of the support target vehicle 2A. For example, the communication unit 25 transmits the position information of the support target vehicle 2A to the server 10, and thereby acquires the information of the support target intersection candidate related to the support target vehicle 2A from the server 10 (the support target intersection candidate database 52). The communication unit 25 may transmit the information of the traveling road on which the support target vehicle 2A is traveling to the server 10, or may transmit the target route of the navigation system to the server 10. The support target intersection candidate related to the support target vehicle 2A is a support target intersection candidate in which the traveling road of the support target vehicle 2A becomes the preferential road.

The actuator 26 is a device used for controlling the support target vehicles 2A. The actuator 26 includes at least a drive actuator, a brake actuator, and a steering actuator.

Next, an exemplary functional configuration of ECU 30 will be described. ECU 30 includes a vehicle position acquiring unit 31, a shielding determination unit 32, a support target intersection extraction unit 33, and a vehicle control unit 34.

The vehicle position acquiring unit 31 acquires the position of the support target vehicle 2A based on the position information measured by GNSS reception unit 21 and the map information in the map database 24. Note that the vehicle position acquiring unit 31 may recognize the position of the support target vehicle 2A by a Simultaneous Localization and Mapping (SLAM) technique using the position information of a fixed obstacle such as a utility pole included in the map information of the map database 24 and the detection result of the external sensor 22.

The vehicle position acquiring unit 31 determines whether or not there is a support target intersection candidate on the traveling road of the support target vehicle 2A based on the information of the support target intersection candidate acquired from the server via the communication unit 25 and the position of the support target vehicle 2A. When the support target vehicle 2A approaches the support target intersection candidate, the vehicle position acquiring unit 31 may determine that the support target intersection candidate exists on the traveling road.

The case where the support target vehicle 2A approaches the support target intersection candidate is, for example, a case where the distance between the support target vehicle 2A and the support target intersection candidate is less than a certain distance. The distance may be, for example, a 20 m or a 30 m. The constant distance is not particularly limited. The shielding determination unit 32 may determine that the support target vehicle 2A has approached the support target intersection candidate when the remaining time until the support target vehicle 2A reaches the support target intersection candidate becomes less than the predetermined time.

The shielding determination unit 32 determines, based on the detection result of the external sensor 22, whether or not the crossing road intersecting the traveling road in the support target intersection candidate is shielded as viewed from the traveling road. The state in which the intersecting road intersecting the traveling road is shielded when viewed from the traveling road is a state in which the visual recognition of the intersecting road (non-priority road) R2 is obstructed when viewed from the traveling road (priority road) R1 by the wall W as shown in FIG. 3, for example.

For example, when a camera or a radar sensor of the external sensor 22 detects a structure (including a natural structure such as a tree or a rock) that blocks the visibility of the intersecting road of the support target intersection candidate, the shielding determination unit 32 determines that the intersecting road is shielded when viewed from the traveling road.

The support target intersection extraction unit 33 extracts the support target intersection from the intersections (support target intersection candidates) where the traveling road of the support target vehicle 2A is the priority road and the risk reduction amount is less than the risk reduction amount threshold.

The support target intersection extraction unit 33 extracts, as the support target intersection, an intersection in which the shielding determination unit 32 determines that the intersection road is shielded from the traveling road among the support target intersection candidates.

The support target intersection extraction unit 33 may extract, as the support target intersection, an intersection in which it is determined that the intersection road is shielded as viewed from the traveling road among the support target intersection candidates and the degree of risk is equal to or greater than a certain value. The support target intersection extraction unit 33 may extract, as the support target intersection, an intersection in which it is determined that the intersection road is shielded as viewed from the traveling road and in which the rapid deceleration information is associated among the support target intersection candidates.

Further, the support target intersection extraction unit 33 may extract, as the support target intersection, an intersection in which it is determined that the intersection road is shielded as viewed from the traveling road among the support target intersection candidates and the determination result that the intersection is a narrow road or an intersection with poor visibility is associated with each other. The support target intersection extraction unit 33 may extract the support target intersection by using a combination of a risk level, a risk taking amount, rapid deceleration information, and a determination result that the intersection is a narrow road or an intersection with poor visibility.

The vehicle control unit 34 executes various types of vehicle support of the support target vehicle 2A on the basis of the detection result of the external sensor 22. For example, when the distance to the support target intersection of the support target vehicle 2A becomes less than the support start distance, the vehicle control unit 34 starts the slow-down support and the lateral avoidance support.

The slow deceleration support is a vehicle support for slowly decelerating the support target vehicle 2A. The lateral avoidance assistance is a vehicle assistance that performs steering or steering assistance (such as reduction of a steering reaction force) of a vehicle 2A to be assisted so as to be separated from a crossroad that is shielded. The vehicle control unit 34 may execute only one of the slowing-down support and the lateral avoidance support. Accordingly, the vehicle control unit 34 can support the risk reduction driving of the driver at the support target intersection.

The vehicle control unit 34 may determine the support amount according to the risk level when the risk level associated with the support target intersection candidate is acquired from the server 10. The vehicle control unit 34 increases the support amount, for example, as the degree of risk increases. The assistance amount is, for example, a deceleration amount in the slow deceleration assistance, and is a lateral avoidance amount in the lateral avoidance assistance (a distance away from the intersecting road).

When the risk take amount data (data of the risk take amounts of the plurality of probe vehicles 2) associated with the support target intersection candidate is acquired from the server 10, the vehicle control unit 34 determines the support amount by using the average value of the risk take amounts, thereby enabling the general driver to perform vehicle support with less discomfort. The vehicle control unit 34 may determine the assistance amount by using both the risk taking amount and the risk degree.

The vehicle control unit 34 may adjust the degree of assistance in accordance with the preference of the driver for vehicle assistance. The vehicle control unit 34 sets the driver's preference for vehicle assistance in three stages of high sensitivity, medium sensitivity, and low sensitivity, for example, based on the driver's input. At this time, by using the variance of the amount of risk taking, if "high sensitivity: general driver−1σ", "medium sensitivity: general driver equivalent", and "low sensitivity: general driver+1σ" are used, it is possible to set the amount of assistance corresponding to the amount of risk taking of the intersection to be supported and reflecting the preference of the driver.

The vehicle control unit 34 may make the operating condition of the collision damage mitigation brake at the support target intersection less than the operating condition at the other intersection. To loosen the operating condition of the collision damage mitigation brake is to make it easier to operate the collision damage mitigation brake.

For example, the vehicle control unit 34 may set the operation threshold at the support target intersection to be larger than the operation threshold at the other intersection with respect to Time to Collision (TTC between the support target vehicle 2A and the obstacle as the operation condition of the collision damage reduction braking. Further, the vehicle control unit 34 may set the necessary threshold value of the obstacle recognition reliability of the external sensor 22 as the operating condition of the collision damage reduction brake to a value smaller than that of the other intersections. As a result, the vehicle control unit 34 can activate the collision damage reduction brake at the moment when the traffic participant sees a little from the intersecting road shielded by the wall W or the like at the support target intersection, so that appropriate collision avoidance can be performed.

When the rapid deceleration occurrence information (near miss information) is stored in the support target intersection candidate database 52 in association with the support target intersection, the vehicle control unit 34 may make the operation condition of the vehicle support loose compared with the operation condition at the other intersection. The vehicle control unit 34 may make the operating condition of the collision damage reduction brake less than the operating condition at the other intersection, for example, only when the sudden deceleration occurrence information is stored in association with the support target intersection.

Processing of the Support Target Intersection Extraction System

Figure 5:
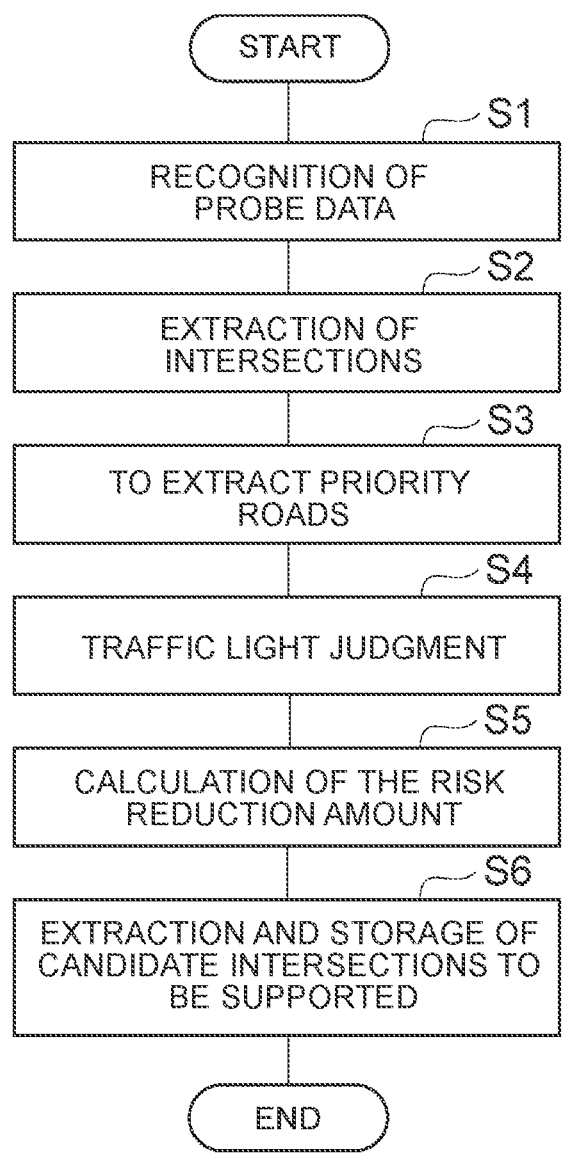
FIG. 5 is a flowchart illustrating an example of storage processing of support target intersection candidates.

Next, the processing of the support target intersection extraction system 1 according to the present embodiment will be described with reference to the drawings. FIG. 5 is a flowchart illustrating an example of a process of storing support target intersection candidates. The storage processing of the support target intersection candidate is executed at regular intervals.

As illustrated in FIG. 5, the server 10 of the support target intersection extraction system 1 recognizes the probe data transmitted from the probe vehicle 2 as S1. The server 10 acquires the position information and the travel information as probe data from the plurality of probe vehicles 2 via the network N.

In S2, the servers 10 extract intersections from the map data in the map database 50. Note that the extraction range of the intersection may be narrowed down to an arbitrary range.

In S3, the servers 10 extract the priority road from the roads connected to the intersection by the priority road extraction unit 11a. The priority road extraction unit 11a extracts, as the priority road, a road in which the average of the vehicle speed reduction amounts of the probe vehicles 2 in front of the intersection is less than a certain threshold from the vehicle speed change corresponding to the positions of the plurality of probe vehicles 2 that travel on the roads intersecting each other at the intersection and approach the intersection, for example.

In S4, the servers 10 perform traffic light determination by the priority road extraction unit 11a. When the map information includes information on the presence or absence of a traffic light at the intersection, the priority road extraction unit 11a determines the presence or absence of a traffic light at the intersection based on the map information. The priority road extraction unit 11a may determine the presence or absence of a traffic light at the intersection based on the vehicle speed data of the probe vehicle 2.

In S5, the server 10 calculates the risk reduction amount at the intersection the priority road side at the intersection where the priority road is extracted by the risk reduction amount calculation unit 11b. The risk reduction amount calculation unit 11b calculates, as the risk reduction amount, a difference between the risk field values of the temporary travel locus Cv and the actual travel locus Cr in the section from the probe-vehicle 2B to the entrance of the intersection T shown in FIG. 3, for example.

In S6, the servers 10 extract and store support-target intersection candidates by the candidate storage unit 11c. The candidate storage unit 11c extracts, for example, an intersection in which the priority-road is extracted, there is no traffic light, and the risk reduction amount is less than the risk reduction amount threshold, as the support target intersection candidate. The candidate storage unit 11c stores the support target intersection candidate in the support target intersection candidate database 52. The candidate storage unit 11c sets a risk level for each candidate intersection to be supported, and stores the risk level in association with the candidate intersection to be supported.

Figure 6:
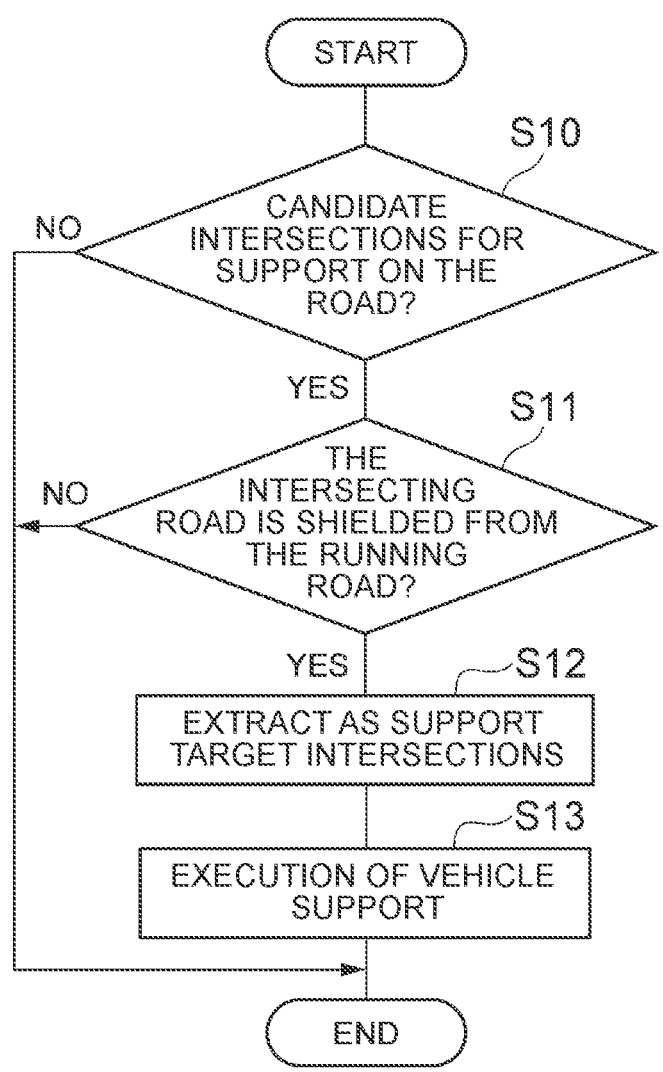
FIG. 6 is a flowchart illustrating an example of a vehicle support process of a support target intersection.

Next, a process of ECU 30 (vehicle support device) of the support target vehicle 2A according to the present embodiment will be described referring to the drawings. FIG. 6 is a flowchart illustrating an example of a vehicle support process of a support target intersection. The vehicle support process of the support target intersection is executed, for example, when the driver turns on the vehicle support function.

As illustrated in FIG. 6, ECU 30 determines, as an S10, whether or not there are support-target intersection candidates on the traveling road of the support-target vehicle 2A by the vehicle position acquiring unit 31. When it is determined that the support target intersection candidates exist on the traveling road (S10: YES), ECU 30 proceeds to S11. When it is not determined that the support target intersection candidates exist on the traveling road (S10: NO), ECU 30 ends the vehicle support process of the present support target intersection.

In S11, ECU 30 determines, by the shielding determination unit 32, whether or not the intersecting road intersecting the traveling road as the support target intersection candidates is shielded as viewed from the traveling road. The shielding determination unit 32 performs the above determination based on the detection result of the external sensor 22. When it is determined that the crossing road is shielded from the traveling road (S11: YES), ECU 30 proceeds to S12. When it is not determined that the crossing road is shielded as viewed from the traveling road (S11: NO), ECU 30 ends the vehicle support process of the current support target intersection.

In S12, ECU 30 extracts the support target intersection by the support target intersection extraction unit 33. The support target intersection extraction unit 33 extracts, as the support target intersection, a support target intersection candidate for which the shielding determination unit 32 determines that the intersection road is shielded as viewed from the traveling road. The support target intersection extraction unit 33 may extract the support target intersection by using a combination of a risk level, a risk taking amount, rapid deceleration information, and a determination result that the intersection is a narrow road or an intersection with poor visibility.

In S13, ECU 30 executes the vehicle support at the support target intersection by the vehicle control unit 34. The vehicle control unit 34 executes vehicle support such as slow deceleration support and lateral avoidance support for the support target intersection.

According to the support target intersection extraction system 1 described above, by extracting the support target intersection from the intersections where the traveling road of the support target vehicle is the priority road and the risk reduction amount is less than the risk reduction amount threshold, it is possible to appropriately extract the support target intersection that is the target of the vehicle support of the support target vehicle.

Further, in the support target intersection extraction system 1, the shielding determination unit 32 determines whether or not an intersection intersecting-road intersecting with the traveling road in the support target intersection candidate is shielded when viewed from the traveling road, and extracts the intersection where the intersection road is shielded when viewed from the traveling road as the support target intersection, so that the vehicle support can be performed so as to reduce the risk of jumping out of the traffic participants from the intersection road.

Further, in the support target intersection extraction system 1, since the intersection without a traffic light is extracted as the support target intersection, the vehicle support can be performed so that the risk can be reduced at the intersection where the jumping of the traffic participants from the intersection road is likely to occur due to the absence of the traffic light.

In addition, according to ECU 30 (vehicle support device) of the support target vehicle 2A, in the vehicle control unit 34, by making the operating condition of the collision damage reduction braking at the support target intersection loose compared with the operating condition at the other intersection, it is possible to cause the vehicle support to be performed so as to be able to reduce the risks at the support target intersection where the traffic participants tend to jump out from the intersection.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

In the support target intersection extraction system 1, all the functions may be mounted on one support target vehicle 2A. That is, in ECU 30 of the support target vehicle 2A, the prioritized road determination and the risk-reduction-amount calculation may be performed on the basis of the position information and the travel information transmitted from the probe vehicle 2.

The server 10 does not necessarily need to grasp information on the presence or absence of a traffic light at an intersection from the map information. The server may estimate that there is no traffic light at the intersection based on the extraction result of the priority road. When the server 10 extracts an intersection where the priority road and the non-priority road intersect, it may estimate that the intersection is an intersection without a traffic light.

In addition, it is not necessary to grasp any information on the presence or absence of a traffic light in the server 10. In 2A of the support target vehicle, ECU 30 may determine the presence or absence of a traffic light at an intersection in front of the support target vehicle 2A from captured images of the cameras.

The method of determining the risk reduction amount is not limited to the above-described contents. The risk reduction amount calculation unit 11b may obtain, as the risk reduction amount, a value in which the actual travel locus Cr is proportional to the distance away from the non-priority road R2 at the intersection T in the situation shown in FIG. 3, and may use, as the risk reduction amount, a difference between the actual travel locus Cr and the collision speed of the temporary travel locus Cv when it is assumed that the pedestrian at a constant speed jumps out from the non-priority road R2.

ECU 30 of the support target vehicle 2A does not necessarily have to include the shielding determination unit 32. In the extraction of the support target intersection, the shielding determination may not be used, and the determination result of the intersection with poor visibility in the server 10 may be used instead of the shielding determination.

The vehicle control unit 34 does not necessarily need to perform slow-down support or lateral avoidance support. The vehicle control unit 34 does not necessarily need to change the operating condition of the collision damage reduction brake between the support target intersection and the other intersection.

What is claimed is:

1. A support target intersection extraction system that extracts a support target intersection that is a target of vehicle support in a support target vehicle among intersections included in map information, the support target intersection extraction system comprising:

a processor that:
extracts a priority road among roads connected to the intersection, based on position information, travel information, and the map information acquired from a plurality of probe vehicles; and
calculates a risk reduction amount on the priority road side at the intersection where the priority road is extracted, based on the position information and the travel information acquired from the probe vehicles; and an electronic control unit that:
extracts the support target intersection from the intersections where a travel road of the support target vehicle is the priority road and the risk reduction amount is less than a risk reduction amount threshold; and
executes the vehicle support at the support target intersection, the vehicle support including slow deceleration support or lateral avoidance support, the lateral avoidance support including a vehicle assistance that performs steering or steering assistance of the support target vehicle.

2. The support target intersection extraction system according to claim 1, wherein the electronic control unit determines whether an intersecting road intersecting the travel road at the intersection is shielded when viewed from the travel road, based on a detection result of an external sensor of the support target vehicle, wherein the electronic control unit extracts the support target intersection from among the intersections where a determination is made that the intersecting road is shielded when viewed from the travel road, among the intersections where the travel road of the support target vehicle is the priority road and the risk reduction amount is less than the risk reduction amount threshold.

3. The support target intersection extraction system according to claim 1, wherein the electronic control unit extracts the support target intersection from the intersections without a traffic signal, among the intersections where the travel road of the support target vehicle is the priority road and the risk reduction amount is less than the risk reduction amount threshold.

4. The support target intersection extraction system according to claim 1, wherein the electronic control unit extracts the support target intersection using rapid deceleration occurrence information of the probe vehicles at the intersection, among the intersections where the travel road of the support target vehicle is the priority road and the risk reduction amount is less than the risk reduction amount threshold.

5. A vehicle support device that executes vehicle support of the support target vehicle at the support target intersection extracted by the support target intersection extraction system according to claim 1, the vehicle support device comprising the electronic control unit that executes a collision damage reduction brake as the vehicle support based on a detection result of an external sensor of the support target vehicle, wherein the electronic control unit loosens an operating condition of the collision damage reduction brake at the support target intersection compared to an operating condition at another intersection.

* * * * *